No. 792,701. PATENTED JUNE 20, 1905.
J. GREENWOOD.
TREE FOR BOOTS OR SHOES.
APPLICATION FILED NOV. 3, 1904.
2 SHEETS—SHEET 2.
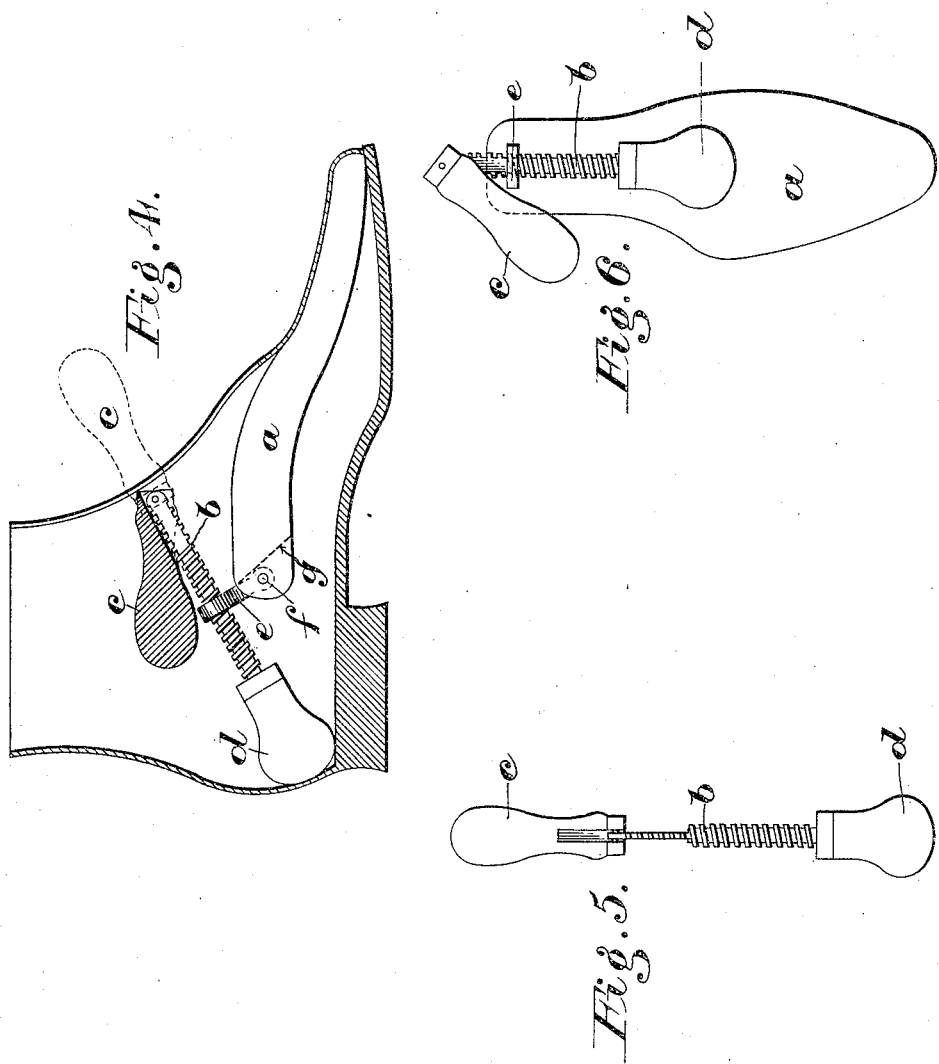

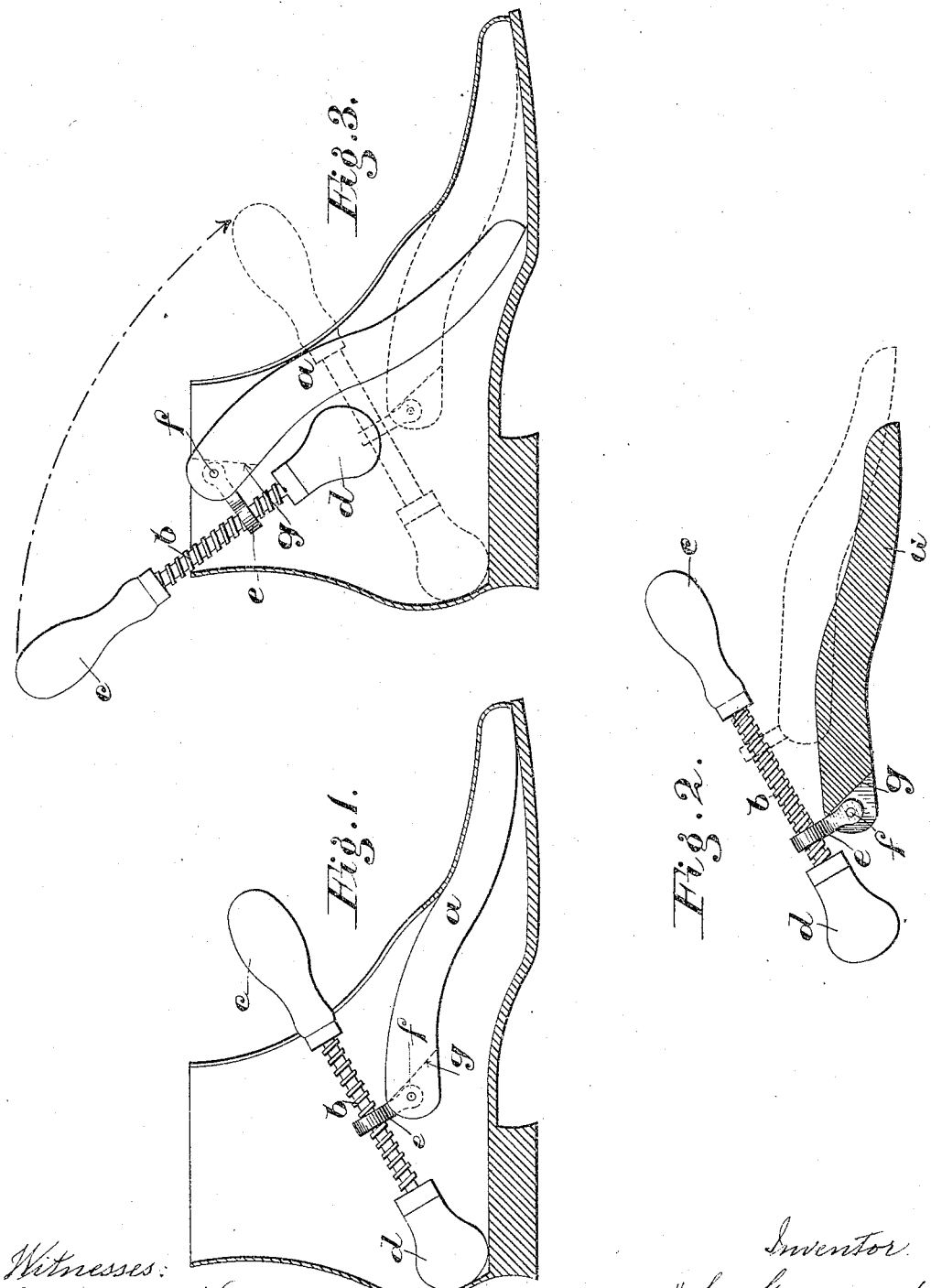

No. 792,701.

Patented June 20, 1905.

UNITED STATES PATENT OFFICE.

JOHN GREENWOOD, OF ACCRINGTON, ENGLAND.

TREE FOR BOOTS OR SHOES.

SPECIFICATION forming part of Letters Patent No. 792,701, dated June 20, 1905.

Application filed November 3, 1904. Serial No. 231,278.

*To all whom it may concern:*

Be it known that I, JOHN GREENWOOD, residing at 1 Marlborough street, Accrington, England, have invented certain new and useful Improvements in Trees for Boots or Shoes; and I do hereby declare the following to be a full, clear, and exact description of the invention, such as will enable others skilled in the art to which it appertains to make and use the same.

My invention relates to trees for boots and shoes; and it consists in certain improvements upon that type or class of trees in which a screwed rod is employed for the purpose of adjusting the position of a sole and heel piece in the boot or shoe.

My improvements will be readily understood by reference to the accompanying sheets of drawings, wherein—

Figure 1 represents a boot-tree constructed according to my invention in position in a boot. Fig. 2 illustrates the movement of the sole-piece in treeing and stretching the boot. Fig. 3 illustrates the method of introducing the tree into the boot, fixing it into position therein, and withdrawing it therefrom; and Figs. 4, 5, and 6 illustrate a modification.

Letter $a$ indicates the body or sole-piece of the tree, which may be of wood or other suitable material; $b$, a screw-threaded rod provided with a handle $c$ for rotating the screw and with a knob $d$ for bearing against the heel of the boot. A nut or washer $e$ on the said screw $b$ is attached to the sole-piece $a$, being pivoted on a cross-pin $f$ in a slot $g$ in the said sole-piece $a$, which cross-pin $f$ may be engaged by a hooked or looped extension of the said nut $e$.

The pivotal connection of the nut $e$ in the slot $g$ allows the tree to be folded for packing, with the knob $d$ under the lower side of the piece $a$, and in this position the tree is inserted into the boot, as shown in full line in Fig. 3. By pulling the handle $c$ forward in the direction of the arrow the knob $d$ is turned round into the heel of the boot, as shown in dotted lines, and the piece $a$ forced toward the toe, and when the nut $e$ is at the top of the slot $g$ and the screwed rod $b$ is firmly held at a constant angle or slope and the handle $c$ rotated, so as to raise the nut $e$ up the screw, the movement of the sole-piece $a$ will be both forward and upward, as shown in dotted lines in Fig. 2, thus exerting a pressure on the boot-upper, as well as in the direction of the length of the boot. When once adjusted to suit the particular boot for which it is intended to be used, the position of the nut on the screw does not afterward require to be altered, as by turning over the handle $c$ in the reverse direction to that of the arrow, Fig. 3, the tree is brought into the position shown in full line, when it can of course be withdrawn.

The form of this tree, allowing ventilation of the interior of the boot, assists drying, and the tree may act either as a stretcher for tight boots or as an ordinary tree for preventing shrinking and preserving the shape of the boot.

The handle $c$ may be slotted and adapted to pivot on the top of the screw $b$, the end of which is partially cut away or flattened, as shown in Fig. 5, which illustrates this portion detached from the sole-piece. This enables the said handle to be turned back into the boot out of sight, as shown in Fig. 4, and also economizes space in packing the trees, the handle being turned to one side, as shown in Fig. 6, which is plan view of the under side of the tree.

I claim as my invention—

1. In a boot or shoe tree, the combination, with a heel-piece, of a revoluble operating-screw arranged axially in line with the said heel-piece, a body or sole-piece having a slot at one end, and a nut having an end portion pivoted in the said slot and held in working position by contact with the upper end portion of the bottom of the slot and engaging with the said screw.

2. In a boot or shoe tree, the combination, with a heel-piece, of a revoluble operating-screw arranged axially in line with the said heel-piece, a foldable operating-handle pivoted to the other end portion of the said screw from the said heel-piece, a body or sole-piece having a slot at one end, and a nut having an end portion pivoted in the said slot and held in working position by contact with the upper end portion of the bottom of the slot and engaging with the said screw.

In testimony whereof I affix my signature in presence of two witnesses.

JOHN GREENWOOD.

Witnesses:
SEWARD H. CROSSLEY,
ALFRED SIMPSON.